July 5, 1960
E. M. SULLIVAN
2,943,842
HEATING AND/OR COOLING SYSTEM
Filed June 26, 1959
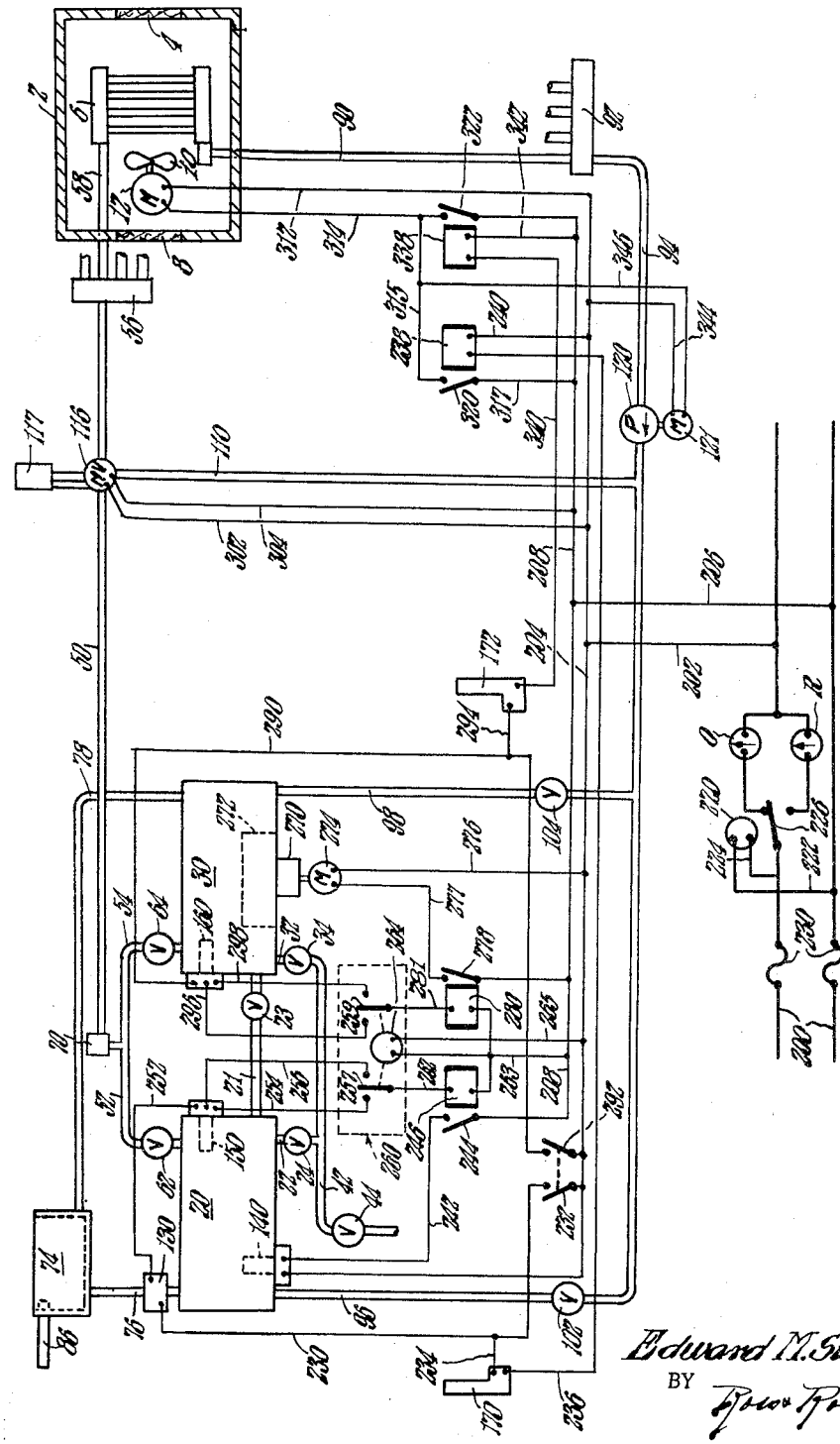
INVENTOR.
Edward M. Sullivan,
BY United States Patent Office 2,943,842
Patented July 5, 1960

2,943,842
HEATING AND/OR COOLING SYSTEM

Edward M. Sullivan, Springfield, Mass., assignor to Alfred W. Bettigole and Oscar H. Sternbane, Springfield, Mass.

Filed June 26, 1959, Ser. No. 823,033
1 Claim. (Cl. 257—279)

My invention is directed to improvements in refinements in a unitary system for the selective heating or cooling of an enclosed space or area or a plurality of enclosed spaces or areas whereby the temperature conditions therein may be better regulated and controlled and is directed more particularly to the provision of an automatic electrical system for the heating and cooling of fluid masses. It envisions a pair of fluid containers (one or both for the storage of a heated fluid and one or both for the storage of a cooled fluid), with an electric heater being disposed within one of the fluid containers for the heating of a supply of the fluid mass therewithin, and an electric cooling unit being disposed within the other of the fluid containers for the cooling of a supply of the fluid mass therewithin. Additionally, a heat or cold exchanger having supply and return connections with both of the fluid containers, and an electrical circuit control actuated by means of differential of temperatures in the space or spaces being regulated are provided. By this combination of elements, I selectively draw on the supply of conditioned heated or cooled fluid in the respective fluid containers all so as to maintain the temperature in the said enclosed space or spaces within predetermined limits.

Specifically, my invention pertains to a central unitary system for selectively heating or cooling which is based upon the employment of a fluid mass which may be heated or cooled during a particular time period and, following such conditioning, may be stored for subsequent use. That is, the heated or cooled fluid may be conditioned during a specific and predetermined time interval and stored for subsequent circulation through the heat or cold exchanger as necessity dictates.

Public utilities supplying electric current normally charge relatively lower rates for said commodity during that increment of the twenty-four hour day when the normal demand for same is low, all in order to stimulate consumption during what is identified as the "off-peak" period. For example, in a particular municipality, the public utility charge for current consumed between the hours of 6:00 a.m. and 12:00 a.m. may be $2.00 per kilowatt whereas the charge for current consumed between the hours of 12:00 a.m. and 6:00 a.m. may be only $1.00 per kilowatt.

The heated and/or cooled fluid mass or masses is stored, so as to appreciably reduce, if not entirely eliminate, the consumption of current during that period of the day representative of the peak demands made upon the power supply system in question.

Stated otherwise, herein is envisioned an electrically operative hot fluid heating/cold fluid cooling system particularly designed for heating/cooling one or more spaces or areas by means of the circulation of a conditioned fluid which has been heated/cooled during the low cost rate time periods and temporarily stored awaiting the demand for the heating or cooling function.

The method aspect of the invention consists of heating/cooling a mass or masses of fluid for storage in a tank or tank utilizing the electrical energy during the night hours or other periods of off-peak load and releasing the conditioned heated or cooled fluid so stored in the respective storage bodies for circulation through the space or spaces being served as and when required.

The off-peak capacity of the electrical power system is preferentially used, it being explained however that provision is herein made for the operation of the system during abnormal or emergency conditions when and as circumstances may dictate that such operation during the on-peak period is indicated. That is to say, while it is the desideratum that said conditioning be accomplished during the off-peak period, conditioning during the on-peak period is not precluded.

The circulation of the hot or cold fluid mass from its respective storage point is automatically controlled by thermostatic means arranged to maintain a constant predetermined temperature within an enclosed area or areas being served, said thermostatic means being responsive to the temperature condition in said area or areas and conceivably being further responsive to the outdoor temperature in the adjacent locality.

The system contemplates the inclusion of a fluid conditioning means provided for the conditioning of a volume of fluid at a central conditioning point or mixing valve station preparatory to its distribution to the air handling unit or plurality thereof respectively disposed in and serving the enclosed area or areas to be served.

In the drawing, the figure is a diagrammatic view of the heating/cooling system of the invention.

Before the structure herein illustrated is specifically described, it is to be understood that the invention here involved is not limited to the structural details or arrangement of parts here shown since a construction embodying the present invention may take various forms.

It is also to be understood that the phraseology or terminology herein employed is for purposes of description and not of limitation since the scope of the present invention is defined by the appended claim.

Referring now to the drawings forming a part of this specification more in detail, and referring particularly to the preferred form of my invention selected for illustrative purposes, I have shown a fan housing or plenum 2 having an outlet or grill 4 or the like for the passage of conditioned air therefrom.

The fan housing 2 encloses a radiator 6, a filter 8, an air circulator 10, and a motor 12 therefor. Radiator 6 may comprise any form for receiving hot/cold fluid circulated thereto and therefrom and desirably is of a capacity for maintaining the desired temperatures in the space served thereby. Filter 8 is of common form, is disposed at the entrance of the housing, and is adapted to filter the air circulated through the housing and conditioned preliminary to the discharge thereof. Air circulating means 10 disposed within the housing is driven by the motor 12 and discharges the conditioned air through the grill 4 outwardly to the space being served.

A heated fluid storage tank 20 is of any desired and/or appropriate capacity and is adapted to hold a supply of the heated fluid, which fluid is normally heated therewithin during the off-peak periods and stored for use as required.

A cooled fluid storage tank 30 is likewise of appropriate capacity and is adapted to hold a supply of the cooled fluid, which fluid is normally cooled therewithin during the off-peak periods and stored for use as required.

A supply of unconditioned or makeup fluid is admitted to each of the tanks 20 and/or 30 through conduits 22 and 32 respectively which are each connected to a main conduit 42 leading thereto from a source of supply of said fluid (not shown).

Valves 24, 34 and 44 are appropriately connected in the conduits 22, 32 and 42 respectively to facilitate the flow of said fluid to one or the other or both or neither of the tanks 20 and 30, as operating circumstances may dictate.

A conditioned fluid supply conduit 50 has branches 52 and 54 connected to tanks 20 and 30 respectively and connects to a header or distributor 56 from which a plurality of air handling units such as the one shown and described herein may be served. Only one thereof is shown and described for purposes of simplification, it being understood that one or more air handling units may serve one or more spaces or areas.

A conduit 58 leads from the header 56 and is connected with the radiator 6 for the circulation of the conditioned fluid thereto.

The branches 52 and 54 of said conduit 50 are suitably valved as by valves 62 and 64 respectively so as to facilitate the selective passage of heated or cooled conditioned fluid through the conduit 50 to the header 56 and thence outwardly to the spaces or areas being served.

An automatic vent valve 70 is connected to the conduit 50 for the usual purpose of relieving entrapped air therewithin, all to the end that the flow of the heated or cooled fluid to the radiator 6 may be facilitated.

In the case of an open system, an expansion tank 74 of common form, may be disposed above the tanks 20 and 30 and may be connected thereto as by conduits 76 and 78 respectively. Being open to the atmosphere, said tank 74 compensates for any fluid expansion or contraction during a heating or cooling cycle. An overflow conduit 86 leads from the tank 74 to suitable disposal means, not shown.

A fluid return conduit 90 leads from the radiator 6 and connects with a header 92 which may be connected to other fluid return conduits from radiators similar to 6.

A fluid return conduit 94 connects the header 92 to branches 96 and 98 connected to the tanks 20 and 30 respectively, said branches being suitably valved as by valves 102 and 104 to control the selective return of fluid therethrough to the respective tanks 20 and 30.

A return fluid by-pass conduit 110 conects between the fluid return conduit 94 and the fluid supply conduit 50 through an automatic temperature-controlled mixing valve 116.

Said mixing valve will preferably be of the automatic type and is adapted to mix conditioned fluid flowing from the tanks 20 and/or 30 as the case may be with other return fluid flowing through the fluid return pipe 94 and the fluid by-pass pipe 110 to the end that the fluid mass flowing to the radiator 6 will be properly conditioned to within the desired temperature range.

Said mixing valve 116 may be of the well known, manually operable type such as used in a dwelling where, for instance, hot water from a boiler is mixed with cold water to supply warm water to outlets such as in sinks, baths and the like.

That is to say, this envisions a fluid flow control device which receives hot and cold fluids and has a capacity for discharging a hot or a cold fluid of a predetermined temperature being controlled by a temperature responsive element.

It is contemplated that, for heating purposes, the heated fluid mass flowing to the radiator 6 might be within the temperature range of 105–130° F., depending upon the temperature outside of the house or building and that, for cooling purposes, the cooled fluid mass flowing to said radiator might be within the temperature range of 33–55° F., also depending upon the outside temperature.

Said mixing valve 116 is a fluid flow control valve of the blending type having automatic, thermostatically-operated, means for varying the mixing thereof in accordance with the physical condition of the fluid passing therethrough and has a capacity for controlling the temperature of a mixture of fluids of different temperatures leading thereto. More specifically it functions as the means for controlling the flow of fluids of a predetermined temperature to the radiator 6 and is responsive to the out-of-doors temperature in the area immediately adjacent the enclosed space or spaces being served, through an "outside thermostatic controller" 117 of conventional design. The controller may be in the area served by a heating and cooling unit, if desired.

Stated otherwise, the contemplated valve comprises a casing enclosing a mixing chamber for mixing heated or cooled fluid discharged thereinto from the respective storage tanks 20 and 30 and the return fluid discharged thereinto from the conduit 110 to the end that a conditioned fluid is conducted therefrom to the header 56 and the radiator 6, means therewithin being provided which are responsive not only to the temperature condition of the space being conditioned and but also and simultaneously responsive to the outdoor temperature.

A pump 120 of conventional design and operated by a pump motor 121 is connected in the fluid return pipe 94 for circulating fluid inwardly from the radiator 6 to the tanks 20 or 30, as appropriate, and thence outwardly from said tanks 20 and/or 30 back to the radiator.

An electrical low level cut-off switch device 130 of common form, is provided in the conduit 76 and is adapted to disable the electrical circuits when the level of fluid in said conduit drops to a predetermined low level.

An electric immersion heater 140 is disposed in the tank 20 for heating the fluid therein. Same is preferentially of the sheathed type with a resistance element imbedded in a heat refractory material in such manner that the conductor is supported in spaced relation to and inwardly of the casing of the tank 20. Any known type of immersion or electrode type heater and conceivably any other appropriate type of electrical heating element might be used for the purposes hereof.

An electrical aquastat 150 of the standard heating type with two switches is provided within the tank 20. With such design, in effect, two aquastats are built into the single unit. One of the switches thereof, identified as an off-peak switch, is adapted to open a circuit when the temperature of the heated fluid therein reaches approximately 200° F. The other of said switches, identified as an on-peak switch, is adapted to open when the temperature of the heated fluid reaches approximately 120° F. Each of the switches is provided with a differential of about 10° F. before reclosing.

An electrical aquastat 160 of the standard cooling type with two switches is provided within the tank 30. Here again two aquastats are built into a single unit. One of the switches thereof, identified as an off-peak switch, is adapted to open when the temperature of the cooled fluid therein reaches a low of approximately 35° F. The other of said switches, identified as an on-peak switch, is adapted to open when the temperature of the cooled fluid therein reaches approximately 55° F. Each of the switches is provided with a differential of about 10° F. before reclosing.

Preferentially, aquastat 150 functions on off-peak periods to attain a higher temperature than on on-peak periods of operation and aquastat 160 functions to attain a lower temperature on off-peak than on on-peak periods of operation.

A heating thermostat 170 and a cooling thermostat 172 are provided. Preferentially, these will be combined into a unitary component located in the space the temperature of which it is desired to be regulated. For purposes of simplifying the diagram of the drawing, they are illustrated as being separate entities. Said thermostats are of conventional form and function for the opening and closing of electrical circuits, being automatically responsive to the temperature condition in the space or area served and being further responsive to manual operation thereof by a person adjusting same in said space or area, all as will hereinafter appear.

A main power line from a suitable source of electric power, either A.C. or D.C., is represented by 200, supplies the apparatus hereof, and may of course lead to other electrical components within the building or installation being served in known manner.

An off-peak current consumption meter is represented by O for recording the consumption of current at "off-peak" rates during the established "off-peak" periods. A regular current consumption meter is represented by R for recording current consumption at regular or "on-peak" rates during the established "on-peak" periods.

The meters O and R are disposed in one side of the main power line 200, which is connected by 202 to one side 204 of a power supply line. The other side of the main power source 200 is connected by 206 to the other side 208 of the power supply line.

It will be appreciated that said meters O and R are envisioned as being the property of the public utility involved and serve the function of registering the consumption of electrical energy during the off-peak and on-peak time intervals. Same could easily be combined within a single metering unit having one set of recording devices operable during the off-peak period and another set of recording devices operable during the on-peak period.

An electrically operated time switch 220 of well-known form is connected by connections 222 and 224 to the main power line 200 and includes a blade 226 for connecting one side of the power line 200 to the either off-peak or on-peak meters whereby lines 204 and 208 of the power supply line may be selectively connected through the O meter to the power source during "off-peak" periods and through the R meter to the power source during "on-peak" periods. In said time switch, there is no neutral position, same connecting to either the off-peak or the on-peak meter.

Fuse means of usual form are shown at 230, in lieu thereof, circuit breakers or other devices operable to protect the electrical system against short-circuits, excessive loads, and the like may be employed, as is well known.

It will be observed that means is provided for the heating and cooling of the fluid masses within the respective tanks 20 and 30 during any and all periods of the twenty-four hour cycle. The system is so designed however that, under normal or average operating conditions, whether in the winter season when a greater supply of the heated fluid is obviously necessary, in the summer season when a greater supply of the cooled fluid is obviously necessary, or in the spring and fall seasons when a supply both of heated fluid for morning and evening operation and of cooled fluid for midday operation may be necessary, the heating and/or cooling of the fluid masses within the respective storage tanks 20 and 30 preferentially ensues during the off-peak periods.

It will be explained, at this point that the invention envisions that, during the winter season, the cooling system hereof may be quickly and easily rendered totally inoperative, during the summer season, the heating system hereof may be likewise rendered totally inoperative, and during the spring and fall seasons, the two systems may be operated alternately by the actuation of the switch generally designated by X between a heating position and a cooling position, as will be observed.

Conceivably, it may be desired that both tanks utilized for the storage of the cooled or heated fluid during the mid-summer or the mid-winter seasons. To that end, a pipe 21 connects the tanks 20 and 30 in which is a shut off valve 23 so that fluid may circulate between the two tanks when the said valve 23 is open.

A connection 230 extends from the side 204 of the power supply line to the low-level cut-off 130 of well known form through the switch arm 232 of the switch X.

The low level cut-off switch 130 is also connected by a connection 234 to the thermostat 170, which thermostat is connected by a connection 236 to the holding coil of relay 238. Said relay 238 is connected by a connection 240 to one side 204 of the power supply line.

Heater 140 is connected to the side 204 of the power supply line and by a connection 242 to the other side 208 of the power line, said connection 242 having a switch arm 244 of a relay 246 disposed therein and subsequently to be referred to.

Aquastat 150 is connected to the low level cut-off 130 by a connection 252 and by connections 254 and 256 to contacts for a switch arm 257 of an electrical operated time switch device of the double-pole double-throw type, generally indicated by numeral 260.

Said time switch device 260 is designed to keep in synchronism with or in step with the utility company's time switch 220 and is effective in initiating the heating or cooling of the fluid mass or masses during the off-peak period as conditions may dictate.

As shown, said time switch device is shown in the off-position.

The relay 246 is connected by a connection 262 to the said switch arm 257 of the time switch device, and is connected to the line 208 of the power supply line through a connection 263 which connection connects also to the time clock mechanism 264 of the time switch device 260.

Connection 265 connects the time clock mechanism 264 to the other side 204 of the power supply line.

A motor driven chiller compressor 270 has cooling means which may comprise a cooling unit such as a coil 272 connected thereto, and is preferably disposed within the tank 30. Said compressor is driven by a motor 274. In some cases the cooling coil may be outside the tank 30 with means connecting the cooling unit and tank for cooling the fluid within the tank.

One side of the motor 274 is connected by a connection 276 to one side 204 of the power supply line, and the other side thereof is connected by a connection 277 to the other side 208 of the power supply line, a switch arm 278 of a relay 280 being disposed in said connection 277. Relay 280 is connected to switch arm 259 of the time switch device by connection 281, and to line 208 through connection 263.

Aquastat 160 is connected to one side 204 of the power supply line by a connection 290, a switch arm 292 being disposed in the said connection.

As aforesaid, switch arms 232 and 292 of the switch X constitute a double-pole double-throw switch which is manually shiftable between a neutral off position (through switch arm 232), and a cooling position (through switch arm 292).

The line 290 to aquastat 160 is also connected by a connection 294 to the cooling thermostat 172. Said aquastat 160 is also connected by connections 296 and 298 to contacts for the other switch arm 259 of the time switch device 260.

The mixing valve 116 is electrically connected by connections 302 and 304 to the sides 204 and 208 respectively of the power supply line.

The motor 12 of the air handling unit is connected by 312 to one side 204 of the supply line. A connection 314 extends from said motor to the other side 208 of the supply line, and said connection 314 includes a circuit closing arm 322 of relay 338. Line 314 is connected by 315 to a contact for arm 320 of relay 238, and said arm 320 is connected by 317 to side 208 of the power supply line.

Relay 338 is connected by connection 340 to the thermostat 172 and by connection 342 to the side 208 of the power supply line.

The pump motor 121 is connected by connection 344 to the side 204 of the power supply line, and by connection 346 to connection 315.

The operation of this heating/cooling system is such that a substantially constant temperature will be automatically maintained in the space being served.

With the tank 20 containing a heated fluid mass of a predetermined temperature, the heating system can be placed into operational use. Alternatively, with the tank 30 containing a cooled fluid mass of a predetermined temperature, the cooling system can be placed into operational use.

As aforesaid, the clock operated time switch mechanism 260, connected to opposite sides of the power supply line by connection 263 and 265 operates in synchronism with the time device 220 in the main supply line 200.

The components are shown as being in the neutral or off position except that the switch arm 226 is shown as connecting the off-peak meter O in the main power source.

For normal operation, except when supplying one of the tanks with fluid, the valves 24, 34 and 44 are closed. Valve 23 is closed except when circulation between tanks 20 and 30 is desired.

For heating operation, valve 62 is open and valve 64 is closed.

For heating operation, valve 62 is open and valve 64 is closed. Switch arm 292 of the switch X is open and switch arm 232 is closed to make its contact, connecting the low water cut-off device through 230 to one side 204 of the supply line.

Arm 257 engages contact of line 256 to aquastat 150, this being the off-peak position of arm 257. Relay 246 is connected to one side 208 of the power supply line through 262 and 263.

With the switch of the low water cut-off device 130 closed and when the aquastat 150 calls for heat at the higher temperature so as to close the switch device thereof, relay 246 operates to contact the arm 244 thereof with the contact of line 242 to the heater 140. Thereby, said heater 140 is energized for heating from supply lines 204 and 208. When the aquastat is satisfied and the switch thereof opens, the relay 246 is deenergized and energy to the heater 140 is cut off.

When the thermostat 170 demands heat, so that the switch thereof is closed, the relay 238 is energized so that the arm 320 makes its contact. The motor 12 of the air circulating unit is energized from supply lines 208 and 204 through connections 314, 315, arm 320 and connection 317, and the connection 312. Likewise, pump motor 121 is energized through connections 344 and 346 all until the thermostat 170 is satisfied and the switch thereof opens.

If and when the switch arm 257 is shifted to its on-peak position, to make the contact of line 254, as when the arm 226 connects the R meter in the main power line 200, the other or lower temperature switch of aquastat 150 is brought into play, and the operation for heating operation is substantially as described, except that the circuits are disabled at a lower temperature than when said arm 257 makes the contact of line 256.

For cooling operation, valve 62 is closed and valve 64 is open.

When and as circumstances may dictate that both tanks be used for the storage of cooled water, valve 23 in line 21 connecting therebetween is open and valve 62 additionally may be open wherefor the circulation of the conditioned fluid between the two tanks is facilitated.

In said cooling operation switch arm 232 of the switch X is open and switch arm 292 is closed to make its contact with the connection 299 leading to aquastat 160. In an off-peak period, arm 259 of the time device assumes its off-peak position in contact with connection 298 to said aquastat. The arm 226 will of course connect meter O in the main power line during the off-peak period.

When the aquastat 160 calls for cooling and a switch thereof is closed, relay 280 is energized from lines 204 and 208 through connections 290, 298, arm 259 and connections 281 and 263.

With relay 280 so energized, arm 278 thereof makes contact with connection 277 and motor 274 of the cooling unit so that same is energized from lines 204 and 208 through said connections 276 and 277.

When thermostat 172 calls for a cool fluid so that the switch thereof is closed, relay 338 is energized so that arm 322 thereof makes the contact with connection 314 and motor 12 is energized. At the same time, pump motor 121 is energized.

When the thermostat 172 is satisfied, the switch thereof opens and energy is cut off from motors 12 and 121.

During on-peak periods, the arm 259 of unit 260 engages contact of connection 296 to the aquastat 160, and the operation is as described, except that the water in the tank 30 is not cooled to as low a temperature as with said arm 259 engaging contact of connection 298.

It is to be further understood that the phraseology or terminology employed herein is for the purpose of description and not of limitation. Although specific terms and expressions are employed, they are used in a generic and descriptive sense only and not for purposes of limitation.

I have no intention, in the use of such specific terms and expressions, of excluding any equivalents of the features shown and described or portions thereof, but recognize that various modifications are possible within the scope of the invention claimed.

Without further analysis, the foregoing is intended to so fully reveal the gist of my invention and the construction and operation of the device thereof that others can, by applying current knowledge, readily adapt it for various applications without omitting features which, from the standpoint of prior art, fairly constitute essential characteristics of the generic or specific aspects of this invention.

All modifications and variations as reasonably fall within the meaning and purview and range of equivalency of the disclosure and claim thereof are therefore intended to be embraced herein.

The substitution of equivalents and other changes, modifications and alterations are contemplated, as circumstances may suggest or render expedient, since the invention is susceptible of various changes and modifications without departing from the real spirit or underlying principles of the invention. In other words, it is not desired to limit the invention to the exact construction shown and described as the objects of the invention may be attained by the use of constructions different in certain respects from that disclosed.

The following claim is desired to include within the scope of the invention all such suitable variations, modifications and equivalents by which substantially the results of the invention may be obtained through the use of substantially the same or equivalent devices or means.

Accordingly, limitation of this invention should be made only as determined by a proper interpretation of the terms used in the subjoined claim.

It is intended to claim the invention, broadly as well as specifically, as indicated by the appended claim.

What is claimed as new and useful is:

In an automatically-controlled and selectively operable combination and alternating heating and cooling system for controlling the temperature of a space through which a fluid mass of a heat/cold exchange medium is circulated and based upon the storage of fluid masses being heated or cooled electrically during an off-peak period and being circulated as required comprising, a pair of storage chambers for simultaneous storage of portions of the fluid mass, an electric heater for heating a portion of the fluid mass and disposed within one of the storage chambers of said pair thereof, an electric cooler for cooling a portion of the fluid mass and disposed within the other of the storage chambers of said pair thereof, an air handling unit including a heat exchange radiator and an electrically operated blower, fluid supply and return lines selectively connecting between the storage chambers of said pair thereof and the radiator of said air handling unit for circulating the selected conditioned fluid mass for operational use, an electric motor driven circulating pump for forcing the circulation of the selected conditioned fluid mass from the respective storage chamber of said pair thereof through said fluid supply and return lines and the radiator of said air handling unit, inlet and outlet connections between said cooler and said fluid return line for selectively distributing the used fluid mass to said cooler for cooling treatment, an automatic time switch mechanism for selectively connecting said heater and cooler to an electric power distribution system for operational use during predetermined off-peak load periods for the energizing of the respective heater and cooler and the heating and cooling of the respective fluid mass, and thermostatic means responsive to the differential of temperature in the space being regulated for controlling the operation of the blower of said air handling unit to draw upon the supply of the conditioned fluid mass in said storage chamber for maintaining the temperature in the space being regulated within predetermined limits, and an electric circuit controlled by said thermostatic means and connected to said thermostatic means and said time switch mechanism and said pump and the blower of said air handling unit and said heater and said cooler whereby said heater and cooler are selectively operated to maintain the temperature of the space within certain predetermined limits.

References Cited in the file of this patent

UNITED STATES PATENTS

| | | |
|---|---|---|
| 1,989,997 | Morse et al. | Feb. 5, 1935 |
| 2,241,070 | McLenegan | May 6, 1941 |
| 2,476,018 | Young et al. | Feb. 12, 1949 |